United States Patent [19]
Kamei et al.

[11] Patent Number: 6,011,467
[45] Date of Patent: Jan. 4, 2000

[54] SENSING DEVICE AND DISPLAY METHOD THEREIN

[75] Inventors: Takashi Kamei; Satoshi Noda, both of Kyoto, Japan

[73] Assignee: Omron Corporation, Kyoto, Japan

[21] Appl. No.: 08/975,646

[22] Filed: Nov. 21, 1997

[30] Foreign Application Priority Data

Nov. 21, 1996 [JP] Japan ..................................... 8-310485

[51] Int. Cl.⁷ ................................................. G08B 21/00
[52] U.S. Cl. .............. 340/540; 340/815.45; 340/815.47; 376/259
[58] Field of Search ...................... 340/540, 568, 340/632, 511, 555, 606, 815.45, 815.47; 128/204.6, 204.21; 250/563, 577, 223 B; 356/237, 240; 376/216, 217, 259

[56] References Cited

U.S. PATENT DOCUMENTS

| | | | |
|---|---|---|---|
| 4,502,042 | 2/1985 | Wiihrl et al. | 340/568 |
| 4,553,838 | 11/1985 | Madsen | 356/237 |
| 4,623,902 | 11/1986 | Yamanishi | 346/76 PH |
| 4,902,469 | 2/1990 | Watson et al. | 376/259 |
| 4,931,632 | 6/1990 | Brandt | 250/223 B |
| 5,107,831 | 4/1992 | Halpern et al. | 129/204.26 |
| 5,264,833 | 11/1993 | Jeffers et al. | 340/632 |

FOREIGN PATENT DOCUMENTS 2 037 022   7/1980   Japan .

*Primary Examiner*—Jeffery A. Hofsass
*Assistant Examiner*—Van T. Trieu
*Attorney, Agent, or Firm*—Morrison & Foerster LLP

[57] ABSTRACT

A received light level is displayed by a plurality of LEDs of a received light level display device like a bar graph. A set threshold value is indicated by a plurality of LEDs of a threshold value display device in correlation with the bar graph display. Adjustment of the threshold value is performed stepwise.

15 Claims, 14 Drawing Sheets

Fig.4

| LIGHTED THRESHOLD LEVEL INDICATOR LAMP | RENEWED THRESHOLD LEVEL |
|---|---|
| 22g | $Vth_0 + d \times 6$ |
| 22f, 22g | $Vth_0 + d \times 5$ |
| 22f | $Vth_0 + d \times 4$ |
| 22e, 22f | $Vth_0 + d \times 3$ |
| 22e | $Vth_0 + d \times 2$ |
| 22d, 22e | $Vth_0 + d$ |
| 22d | $Vth_0$ |
| 22c, 22d | $Vth_0 - d$ |
| 22c | $Vth_0 - d \times 2$ |
| 22b, 22c | $Vth_0 - d \times 3$ |
| 22b | $Vth_0 - d \times 4$ |
| 22a, 22b | $Vth_0 - d \times 5$ |
| 22a | $Vth_0 - d \times 6$ |

Fig. 6

| LIGHTED RECEIVED-LIGHT LEVEL INDICATOR LAMPS | RECEIVED LIGHT LEVEL |
|---|---|
| 21a~21h | $Vth_0 + d \times 6 < Vin$ |
| 21a~21g | $Vth_0 + d \times 4 < Vin \leq Vth_0 + d \times 6$ |
| 21a~21f | $Vth_0 + d \times 2 < Vin \leq Vth_0 + d \times 4$ |
| 21a~21e | $Vth_0 < Vin \leq Vth_0 + d \times 2$ |
| 21a~21d | $Vth_0 - d \times 2 < Vin \leq Vth_0$ |
| 21a~21c | $Vth_0 - d \times 4 < Vin \leq Vth_0 - d \times 2$ |
| 21a~21b | $Vth_0 - d \times 6 < Vin \leq Vth_0 - d \times 4$ |
| 21a | $Vth_0 - d \times 8 < Vin \leq Vth_0 - d \times 6$ |
| NO LAMP LIGHTED | $Vin \leq Vth_0 - d \times 8$ |

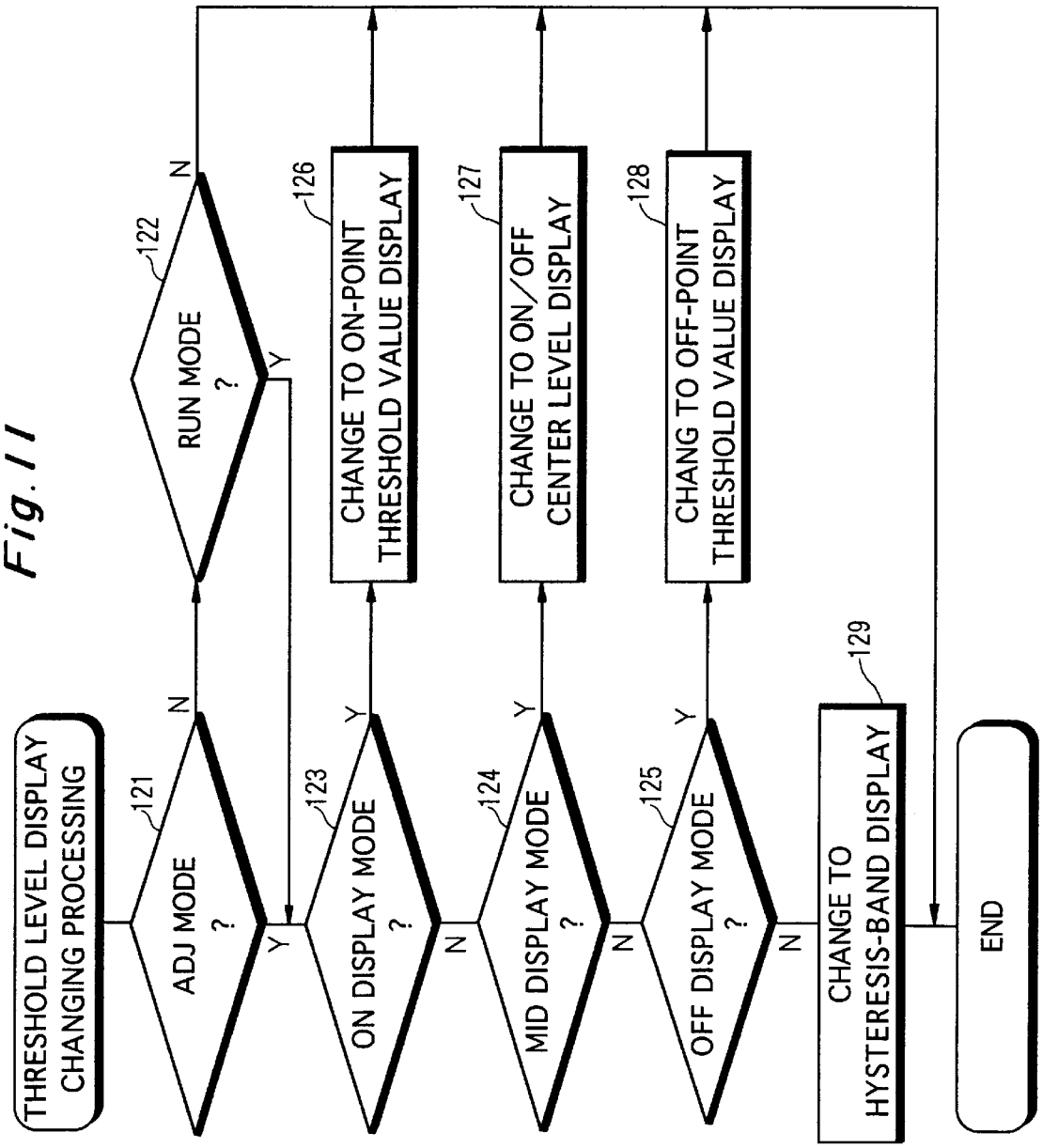

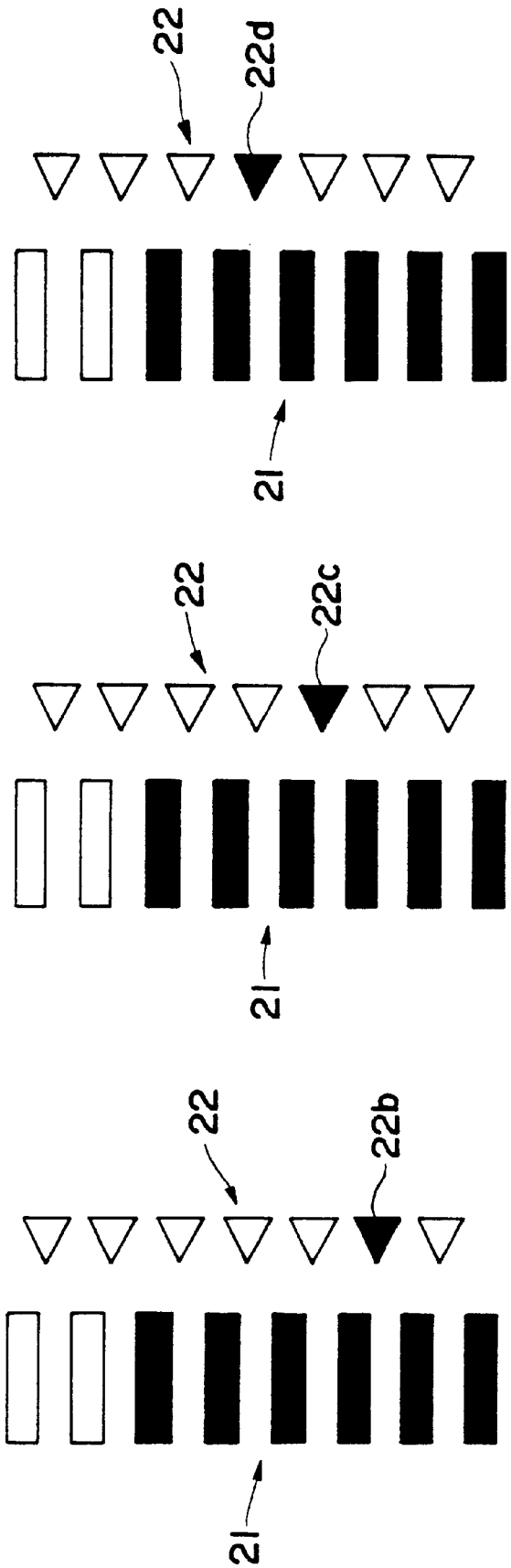

SENSING DEVICE AND DISPLAY METHOD THEREIN

BACKGROUND OF THE INVENTION

1. Field of the Invention

The present invention relates to a sensing device and a display method in the sensing device.

2. Description of the Prior Art

A sensing device such as a photoelectric sensor, a proximity sensor and the like detects an external physical state and compares feature quantity representing physical state with a set threshold value to output an on-signal or a off-signal in dependence upon the comparison result. In such a sensing device, an output indicator lamp is turned on or off in accordance with the output state in order to indicate the output state (on or off state). Further a level of the feature quantity is displayed on a bar graph display device comprising a plurality of indicator elements in order that the level of the feature quantity is recognized. For example, as shown in FIG. 14a, the feature quantity is displayed in a form of a bar graph using a plurality of indicator elements 90, and the output state is displayed by an output indicator lamp 91. Alternatively, as shown in FIG. 14b, the feature quantity is digitally displayed on a numerical display device 92, and the output state is displayed by an output indicator lamp 93.

However, in accordance with the display method in the conventional sensing device, although the output state and the feature quantity are confirmed, the relation is not realized between the displayed feature quantity and the set threshold value. Since it cannot be judged whether the threshold value is appropriate, difficulties arise in setting a threshold value so that the sensing device operates under optimum conditions. Even in a sensing device in which a threshold value can be finely adjusted, adjusting the threshold value to an optimum value is impossible, as the relation is not clear between the displayed feature quantity and the set threshold.

SUMMARY OF THE INVENTION

An object of the present invention is to display feature quantity and a threshold value related to each other.

Another object of the present invention is to make it possible to set the threshold value utilizing the above display.

Still another object of the present invention is to make it possible to adjust the threshold value utilizing the above display.

A sensing device according to the present invention comprises means for acquiring feature quantity representing a physical state to be sensed, a feature quantity display device, which includes a plurality of indicator elements arranged in a line, for indicating the feature quantity acquired by the feature quantity acquiring means by a bar graph expressed by the indicator elements, a threshold display device, which includes a plurality of indicator elements arranged in correspondence with the indicator elements of the feature quantity display device, for displaying a set threshold value in correlation with the bar graph, and judging means for comparing the feature quantity acquired by the feature quantity acquiring means with the threshold value and for outputting the comparison result.

The feature quantity display device and the threshold display device are realized by light-emitting diodes or a liquid crystal display device. In the latter case, liquid crystal display segments, or areas or dots in a liquid crystal display panel correspond to the indicator elements.

A display method according to the present invention in a sensing device which acquires feature quantity representing a physical state to be sensed and compares the acquired feature quantity with a threshold value to output the comparison result, comprising the steps of displaying the acquired feature quantity with a bar graph expressed by a plurality of first indicator elements which are arranged so as to form a row, and displaying the threshold value by a plurality of second indicator elements which are disposed in correspondence with the first indicator elements in correlation with the bar graph display.

According to the present invention, the feature quantity is displayed by the bar graph. Further the threshold value is displayed in correspondence with the indicator elements of the feature quantity display device which display the feature quantity by the bar graph. Accordingly, the user can correctly recognize the relation between the feature quantity and the threshold value.

The present invention enables adjustment of the threshold value. The sensing device according to the present invention comprises means for changing the threshold value in a plurality of discrete points in correlation with the plurality of indicator elements in the threshold display device, and means for holding the threshold value changed by the threshold changing means. The threshold display device indicates the threshold value held by the threshold holding means, and the judging means uses the threshold value held by the threshold holding means in making comparison with the feature quantity.

Accordingly, the user can adjust the threshold value while he or she sees the threshold value displayed in correlation with the feature quantity, which make it possible to realize appropriate threshold adjustment.

The present invention further provides a sensing device in which the threshold value is displayed in correlation with the feature quantity and the threshold value is set or changed (adjusted).

A sensing device according to the present invention comprises means for acquiring feature quantity representing a physical state to be sensed, a feature quantity display device, which includes a plurality of indicator elements arranged in a line, for indicating the feature quantity acquired by the feature quantity acquiring means by a bar graph expressed by the indicator elements, threshold processing means, which include an input device, for setting a threshold value or changing the set threshold value in response to an input in the input device, threshold holding means for holding the threshold value set or changed by the threshold processing means, a threshold display device, which includes a plurality of indicator elements arranged in correspondence with the indicator elements of the feature quantity display device, for displaying the threshold value held in the threshold holding means in correlation with the bar graph, and judging means for comparing the feature quantity acquired by the feature quantity acquiring means with the threshold value held in the threshold holding means and for outputting the comparison result.

The feature quantity is displayed in correlation with the threshold value. The user can set or adjust the threshold value knowing the above display.

The sensing device according to the present invention is expressed in a viewpoint that the threshold value which has been set is adjusted as follows:

In a sensing device acquiring feature quantity representing a physical state to be sensed and comparing the acquired feature quantity with a threshold value to output a signal representing the comparison result, the present invention is characterized by comprising feature quantity display means for displaying the feature quantity by a length representing the feature quantity in a predetermined zone for display, threshold display means for displaying a threshold value at a position of a plurality of positions in correlation with the predetermined zone for display of the feature quantity display means, and adjusting means for adjusting stepwise the threshold value in correlation with the plurality of positions. The threshold display means displays the threshold value adjusted by the adjusting means.

In one embodiment of the present invention, the adjusting means includes an input device and changes a threshold value which has been set in a plurality of discrete points in an ascending direction and in a plurality of discrete points in a descending direction in response to an input in the input device.

In another embodiment of the present invention, the adjusting means includes an adjusting direction selecting device and a value-change instructing device, and causes the threshold position currently displayed to move in a direction selected by the adjusting direction selecting device by a number of steps instructed by the value-changing instructing device.

The user can finely adjust the threshold value which has already set in an ascending direction or in a descending direction at a plurality of points while seeing the threshold value displayed in correlation with the feature quantity.

The present invention also applicable to a sensing device having hysteresis in switching. In this case at least one item of an on-point, an off-point, a middle point between the on-point and the off-point, and a hysteresis band between the on-point and the off-point is displayed as the threshold in accordance with selection and is adjustable at a plurality of points.

The present invention can also be expressed in view of setting of the threshold value as follows:

A sensing device according to the present invention, which acquires feature quantity representing a physical state to be sensed and compares the acquired feature quantity with a threshold value to output a signal representing the comparison result, characterized by comprising feature quantity display means for displaying the feature quantity by a length representing the feature quantity in a predetermined zone for display, and threshold display means for displaying a threshold value at a position of a plurality of positions in correlation with the predetermined zone for display of the feature quantity display means. The feature quantity display means and the threshold display means may be realized by light-emitting diodes or a liquid crystal display device.

The present invention is applicable to a sensing device which has hysteresis output characteristic.

The foregoing and other objects, features, aspects and advantages of the present invention will become more apparent from the following detailed description of the present invention when taken in conjunction with the accompanying drawings.

BRIEF DESCTIPTION OF THE DRAWINGS

FIG. 4 shows relation between the threshold levels and the threshold level indicator lamps which are turned on in correspondence with the threshold level;

FIG. 6 shows relation between the received light level and the received light level indicator lamps which are turned on;

FIG. 11 is a flow chart showing a threshold level display changing processing;

Figure 13B:
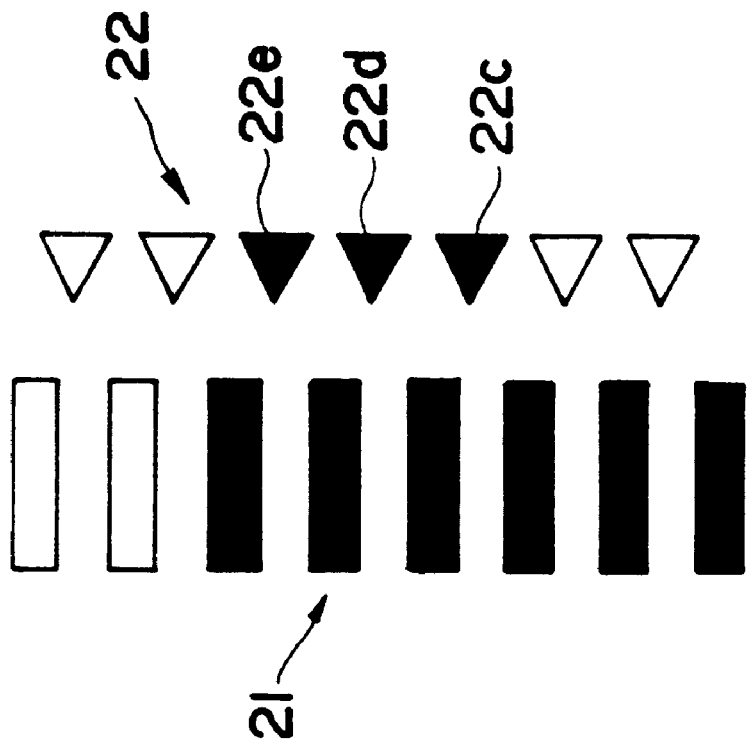
Figure 13A:
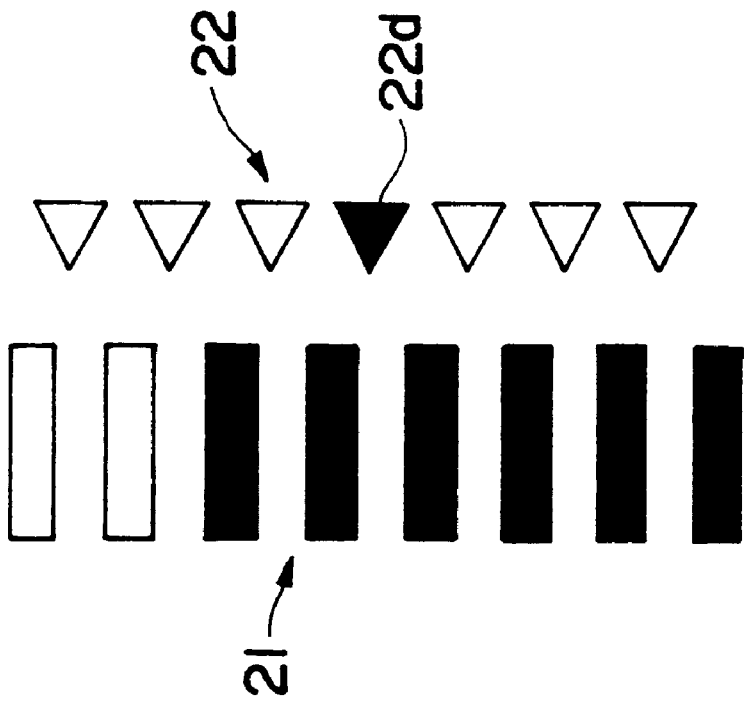
Figure 14A:
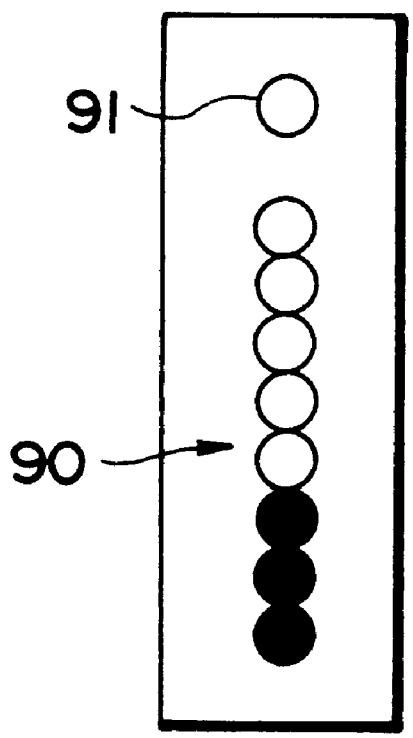
Figure 14B:
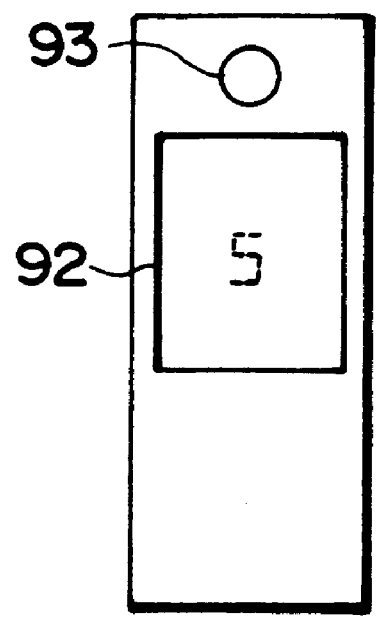

FIGS. 12a, 12b, and 12c show display examples which relate received light level indicator elements to an on-point threshold value, an on/off center level and an off-point threshold value, respectively;

FIGS. 13a and 13b show display examples relating received light levels to hysteresis bands; and FIGS. 14a and 14b show display examples in the conventional sensing devices.

DESCRIPTION OF THE PREFERRED EMBODIMENTS

Figure 1:
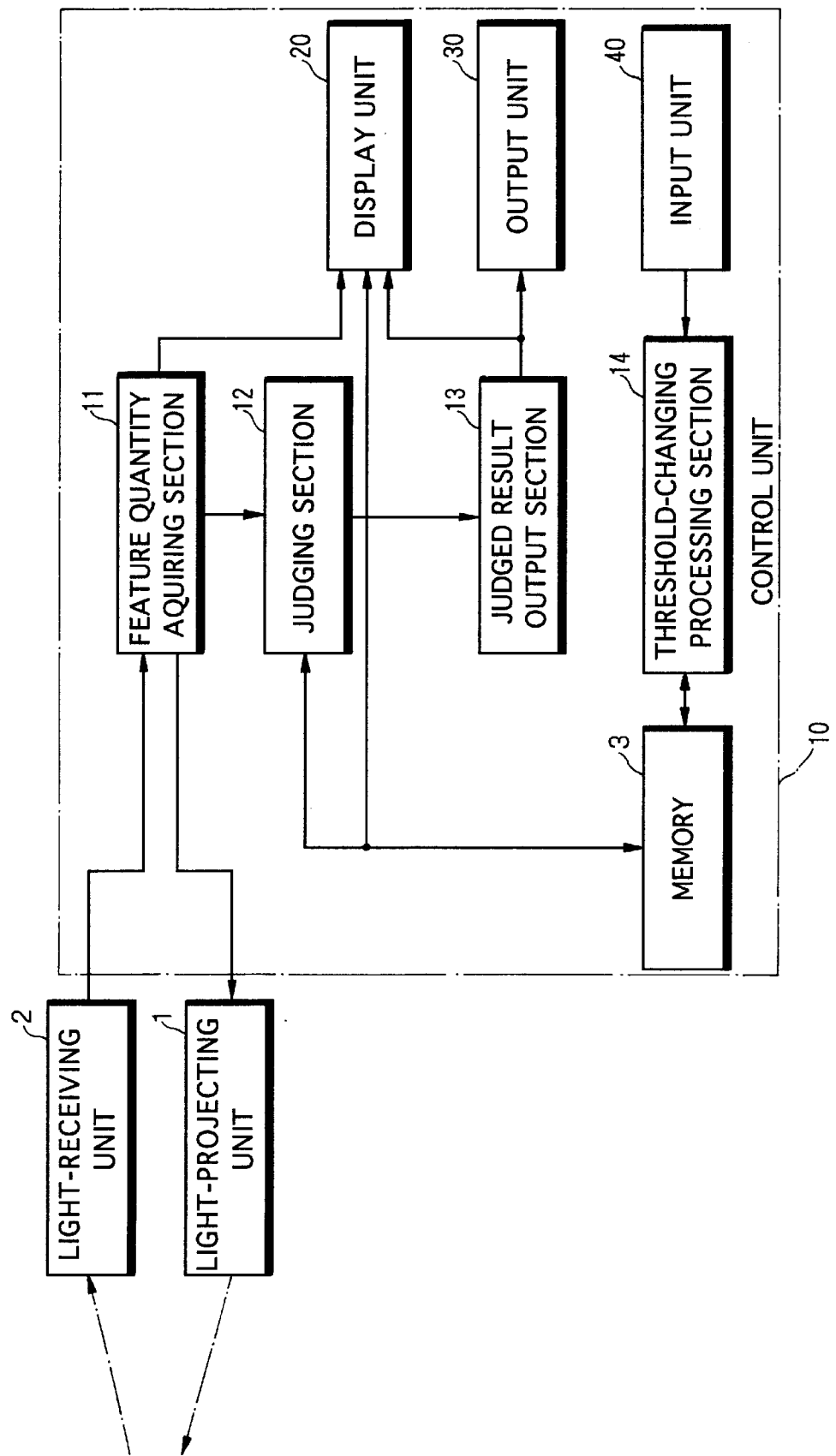
FIG. 1 is a block diagram showing an electrical functional construction of a sensing device according to the first embodiment of the present invention.

This embodiment relates to a reflective-type photoelectric sensor, an electrical construction of which is illustrated in FIG. 1.

The reflective-type photoelectric sensor comprises a light-projecting unit 1, a light receiving unit 2, a control unit 10, a display unit 20, an output unit 30 and an input unit 40.

The light-projecting unit 1 includes a light-emitting diode (or a semiconductor laser), a driving circuit therefor, a light-projecting lens system and the like, and projects periodically (or continuously) pulse light onto an object detection area.

The light-receiving unit 2 includes a light-receiving lens system, a light-receiving element such as a phototransistor or a photodiode, and a light-receiving circuit for amplifying the output signal from the light-receiving element, and converts the output signal to digital data, if necessary (this A/D convention function is not needed, if the control unit 10 is equipped with an A/D converter). The projected light is reflected by an object to be sensed, if the object exists in the detection area, and the reflected light impinges upon the light-receiving element of the light-receiving unit 2. The light-receiving output of the light-receiving unit 2 is fed to the control unit 10.

The control unit 10 is realized by a microcomputer which includes a memory 3 and peripheral devices. Functions performed by the microcomputer are expressed by four blocks, namely a feature quantity acquiring section, a judging section, a judged result output section 13 and a threshold-changing processing section 14.

The feature quantity acquiring section 11 acquires specific physical quantity (feature quantity) of an external state which is sensed by the sensor. The feature quantity differs in accordance with kinds of sensors. In a case of the reflective-type photoelectric sensor, the feature quantity is a received light level of the light reflected from the object. The received light level is produced on the basis of the light-receiving output from the light-receiving unit 2 (by such processings as an A/D conversion, a level conversion, and the like).

The memory 3 stores therein a threshold level Vth for judging an on-state or an off-state, resolution d for adjusting the threshold level, and other data.

The judging section 12 compares the received light level obtained in the feature quantity acquiring section 11 with the threshold level stored in the memory 3. The comparison result is outputted from the judged result output section 13 as an on-signal or an off-signal.

The display unit 20 displays the on/off-output, the received light level and the threshold level. The output unit 30 converts the on/off-signal obtained from the judged result output section 13 into a signal suited to be applied to an external device for the purpose of control and so on. The input device 40 is for a user to enter an instruction, a command or the like for changing modes and the threshold value.

The threshold-changing processing section 14 corrects the threshold level in the memory 3 in accordance with the instruction or command entered from the input unit 40.

Figure 2:
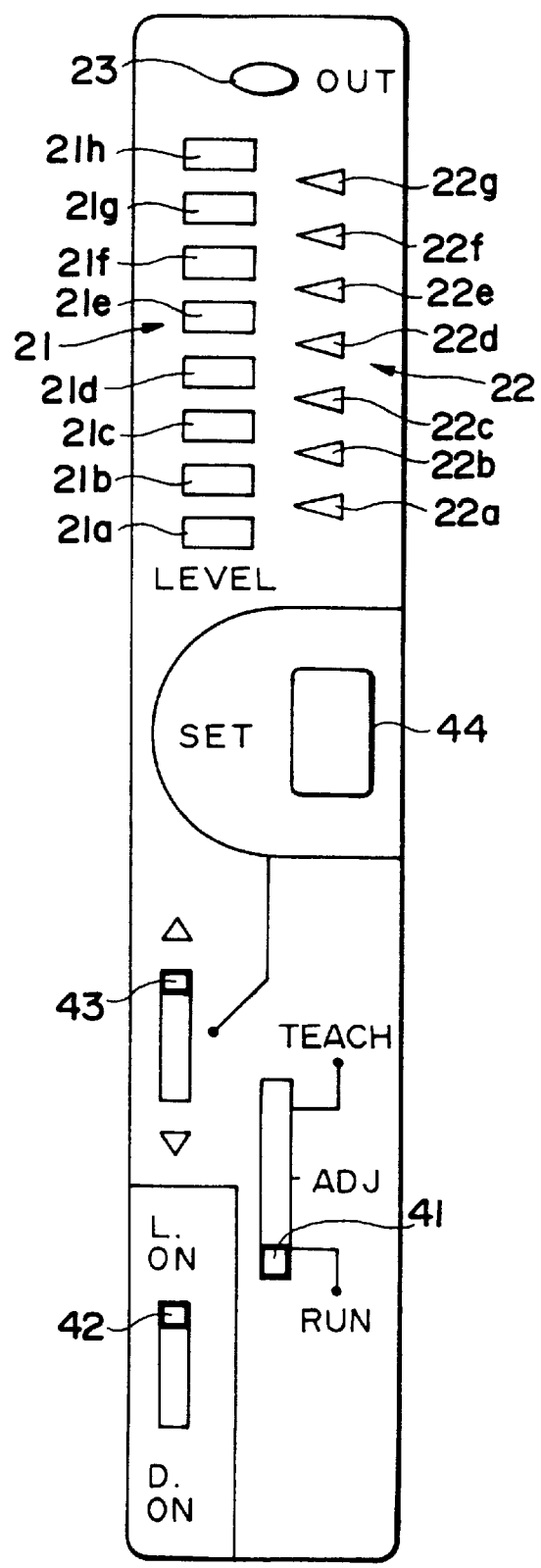
FIG. 2 is a front view of an operation panel of the sensing device.

FIG. 2 is a front view of a panel which the user operates. The panel is provided with the above mentioned display unit 20 and the input unit 40. The output unit 30 may be provided on this panel.

The display unit 20 includes a display device 21 (a feature quantity display device) for displaying the received light level, a display device 22 (a threshold display device) for displaying the threshold level and an output indicator lamp 23. The received light level display device 21 comprises a plurality of (eight in this embodiment) indicator lamps 21a, 21b, 21c, 21d, 21e, 21f, 21g and 21h each realized by a light-emitting diode (LED) arranged in a vertical line to form a column (a bar graph display device), and an LED or LEDs a number of which corresponds to the received light level is lighted in ascending order from the lowermost one. In this embodiment, a range of level displayed by the eight LEDs is limited to the total 36% of the dynamic range of the reflective-type photoelectric sensor, i.e., 18% to the upper side and 18% to the lower side from the center which is defined by the threshold level.

The threshold level display device 22 comprises a plurality of (seven in this embodiment) indicator lamps 22a, 22b, 22c, 22d, 22e, 22f and 22g each realized by an LED arranged in a vertical line and adjacent to the indictor lamps of the received light level display device 21. The threshold level indicator lamp is positioned in the middle of the two adjacent received light level indicator lamps. The lighted indicator lamp(s) (LED) of the display device 22 represents the threshold level.

A cover of the panel is formed to have windows of rectangular shaped and triangular shaped in correspondence with the positions of the LEDs of the display devices 21 and 22. The windows are covered by transparent (or translucent) materials, through which the light from the LEDs can be seen from outside. The triangular window of the indicator lamp of the display device 22 is directed toward the indicator lamps of the display device 21 as if it were an arrow.

The output indicator lamp 23 also comprises an LED and is lighted by either of the on-output or off-output. It is preferred that the received light level display device 21, the threshold level display device 22 and the output indicator lamp 23 emit light beams of different colors.

The input unit 40 includes an operation mode selecting switch 41, an output mode selecting switch 42, an adjust direction selecting switch 43 and a setting button 44.

The operation mode selecting switch 41 is to select one of a teach mode (TEACH) for setting an initial threshold level, an adjust mode (ADJ) for adjusting the threshold level which has been set, and a run mode (RUN) representing an ordinary sensing operation.

The output mode selecting switch 42 is to select one of a mode (light on: L. ON) in which the sensor output is turned on (the output indicator lamp 23 is turned on) when the received light level is high (when the reflected light is incident on the light-receiving device) and a mode (dark on: D.ON) in which the sensor output is turned on (the output indicator 23 is turned on) when the received light level is low (when the reflected light does not impinge on).

The adjust direction selecting switch 43 is to instruct the direction in which the threshold level changed to, when the threshold level is changed in the adjust mode. The setting switch 44 (SET) is operated when the threshold level is set or adjusted.

Figure 3:
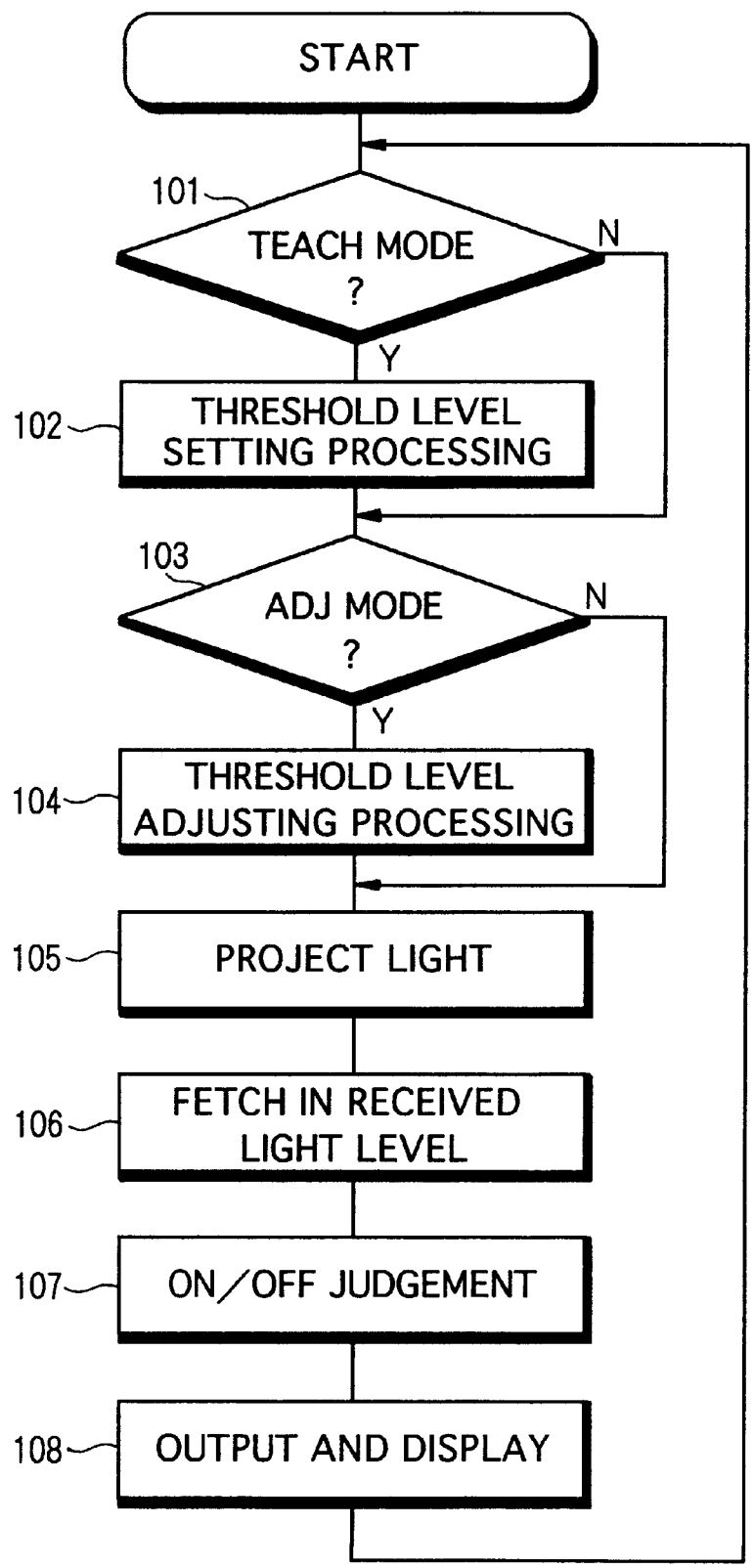
FIG. 3 is a flow chart showing an overall operation of the sensing device.

The operation of the reflective-type photoelectric sensor having the above construction is now described with reference to FIG. 3.

The state of the operation mode selecting switch 41 is checked. If this selecting switch 41 is set in the teach mode (YES at step 101), the threshold level setting processing (setting of the initial threshold level) is performed (step 102).

There are two ways of threshold level teaching for the threshold level setting processing, namely one-point teaching and two-point teaching. The one-point teaching is effective in such a case that works (objects to be sensed) are successively conveyed and the works successively pass through the detection area of the reflective-type photoelectric sensor. The two-point teaching is effective in such a case that the difference is small between the received light level with the work existing and the received light level with the work absent.

In the one-point teaching, the user set the operation mode selecting switch 41 to the teach mode, and turned on the setting button 44 when no work exists in the detection area. Thereafter the user changes over the operation mode selecting switch 41 to the run mode.

The control unit 10 reads and stores the received light level when the setting button 44 is turned on (this received light level is either of the maximum level or minimum level). The works successively pass through the detection area. The control unit 10 fetches into the received light level at a predetermined time interval during a prescribed time period necessary for at least one work, preferably a plurality of works to pass through the detection area. The maximum level and minimum level are extracted from the fetched received light levels, and a threshold level is automatically set in the middle level between the maximum and minimum levels.

In the two-point teaching, the user depresses the setting button 44 when the work exists in the detection area. Further the user depresses the setting button 44 when no work exists in the detection area. The control unit 10 fetches (twice) the received light levels when the setting button 44 is turned on and sets the threshold level in the middle level between the two fetched received light levels.

When the threshold level setting processing is completed, the indicator lamp 22d at the center of the threshold level indicator lamps 22a–22g is lighted.

If the operation mode selecting switch 41 is set in the adjust mode (YES at step 103), the processing for adjusting the threshold level which has been set (manual tuning) is executed (step 104).

In the manual tuning for the threshold level adjusting processing, the user selects the adjust mode with use of the operation mode selecting switch 41, and sets the direction in which the threshold level is to be changed using the adjust direction selecting switch 43. If the switch 43 is moved upward, the threshold level becomes higher, and if the switch 43 is moved downward, the threshold becomes lower. The threshold level is corrected by one unit (above described resolution d) whenever the setting button 44 is depressed in the direction indicated by the adjust direction selecting switch 43. When the adjustment is completed, the user sets the run mode using the operation mode selecting switch 41.

FIG. 4 shows the relation between the threshold level which is renewed each time the setting button 44 is depressed and the threshold level indicator lamp lighted when the threshold level is renewed, assuming that the current threshold level is Vth0. The threshold level becomes higher by d whenever the setting button 44 is depressed in a cace where the adjust direction selecting swtich 43 indicates the ascending direction, while the threshold level becomes lower by d whenever the setting button 44 is depressed in a cace where the adjust direction selecting switch 43 indicates the descending direction.

When the threshold level is Vth0, the threshold level indicator lamp 22*d* in the center is lighting. When the threshold level becomes Vth0+d, the indicator lamp 22*d* and the indicator lamp 22*e* positioned just above light. When the threshold level becomes Vth0+2d, only the indicator lamp 22*e* lights. In a case where the threshold level descends, the lower indicator lamp(s) lights. The seven indicator lamps 22*a*–22*g* enables the user to perform thirteen-level fine adjustment of the threshold level (inclusive of the current threshold level Vth0). Generally speaking, (2n−1)-level adjustment is possible in a case of n threshold level indicator lamps.

Figure 5:
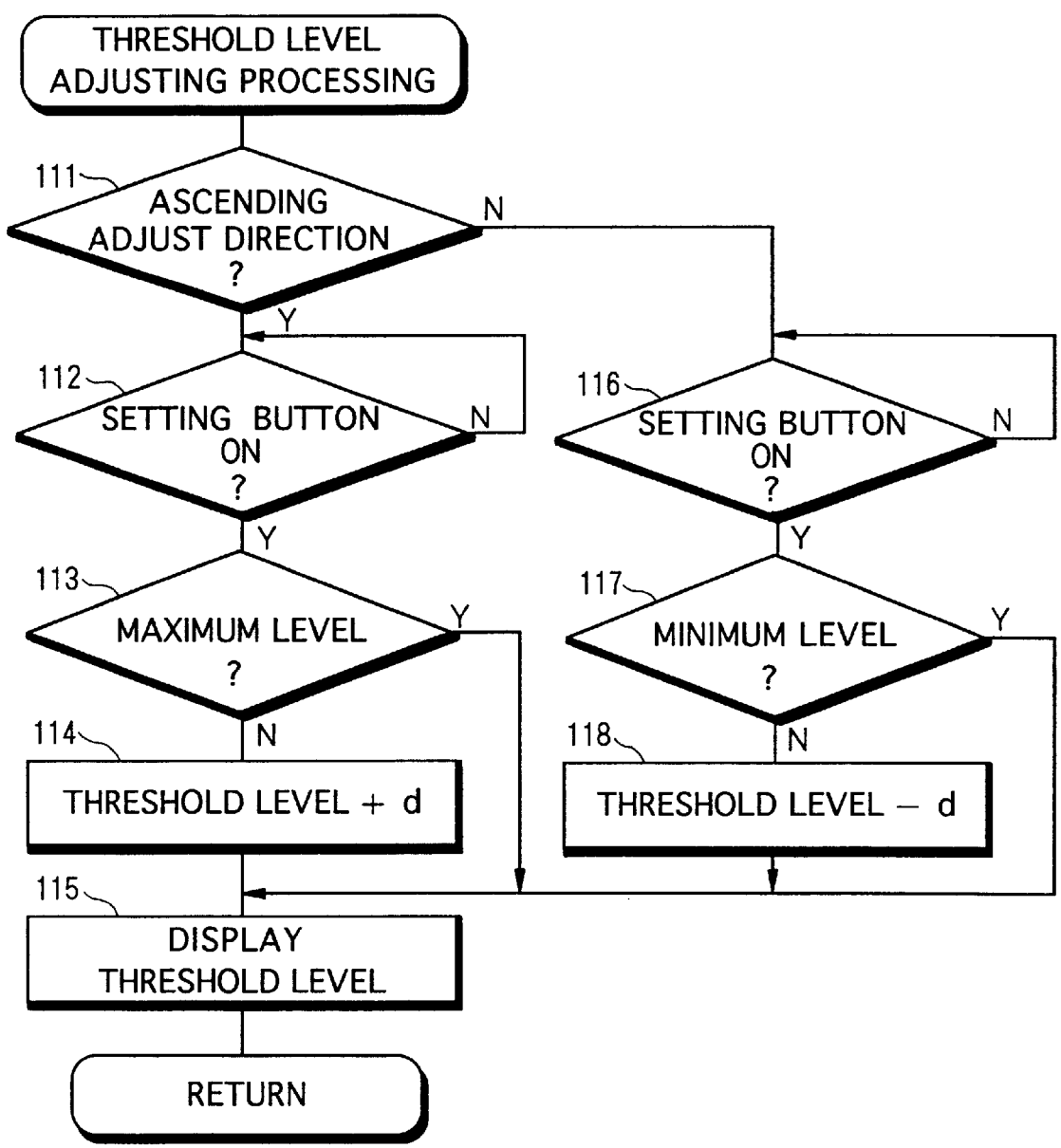
FIG. 5 is a flow chart showing a threshold level adjusting processing.

FIG. 5 shows details of the threshold level adjusting processing (step 104).

It is checked whether the adjust direction selecting switch 43 is set in the ascending direction of the threshold level or the descending direction (step 111). In either direction, when the setting button 44 is depressed (steps 112 and 116), it is checked whether the current threshold level attains the maximum level (Vdt0+6d) in the adjustable range in a case of the ascending direction (step 113), and whether the current threshold level is the minimum level (Vdt0−6) in a case of the descending direction (step 117). If the maximum or minimum level is not attained, the threshold level can be increased or decreased. The current threshold level is incremented or decremented by one unit d in accordance with the adjust direction (step 114, 118). The threshold level indicator lamp(s) corresponding to the new threshold level is lighted according to the table shown in FIG. 4. In this way, the threshold level is adjusted stepwise by the depression of the setting button 44.

When the current threshold level is the maximum or minimum level in the adjustable range, the threshold level adjustment is impossible any more. In such a case, a new threshold level setting in accordance with the threshold level setting processing in step 102 will be required.

After the threshold level adjusting processing or the threshold level setting processing, or when the run mode is set (NO at step 103), the control unit 10 issues a light-projection instruction to the light-projecting unit 1 (step 105). In response to this instruction, pulse light is projected from the light-projecting unit 1. Thereafter the control unit 10 fetches the light-receiving signal from the light-receiving unit 2 upon A/D conversion (step 106). The fetched received light level is compared with the threshold level Vth0±md (m=0, 1−6) which has been set or adjusted (step 107), and the comparison result is outputted as a sensor output and display processing using the received light level display device 21 and the output indicator lamp 23 is performed (step 108). The processing routine as shown in FIG. 3 is executed every predetermined time period.

FIG. 6 shows the relation between the received light level inputted from the light receiving unit 2 and lighted received level indicator lamps in the light-on mode. The received light level Vin is expressed in relation to the threshold level.

FIG. 7 illustrates display examples of the received light level display device 21, the threshold level display device 22 and the output indicator lamp 23. The lighted indicator lamp is expressed in black. The examples shown in FIG. 7 are the display state of the threshold level display device 22 after the threshold level adjusting processing at step 104, and the display state of the received light level display device 21 and the output indicator lamp 23 at step 108. It is assumed that the light-on mode is selected using the output mode selecting switch 42.

Figure 7A:
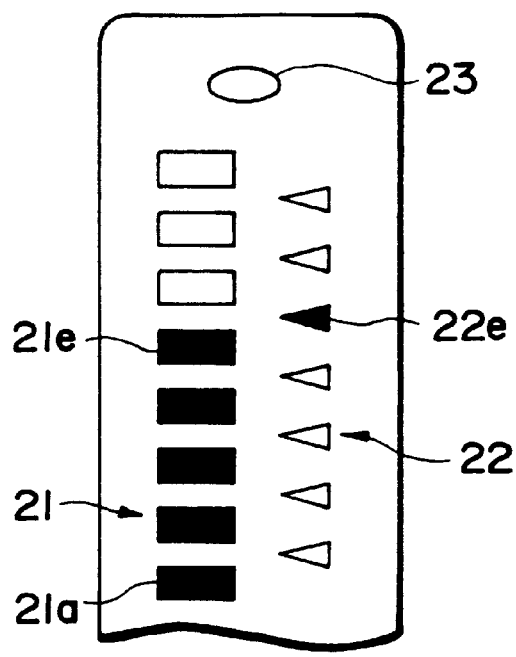
FIGS. 7a, 7b, 7c and 7d show display examples of the received light level and the threshold value.
Figure 7B:
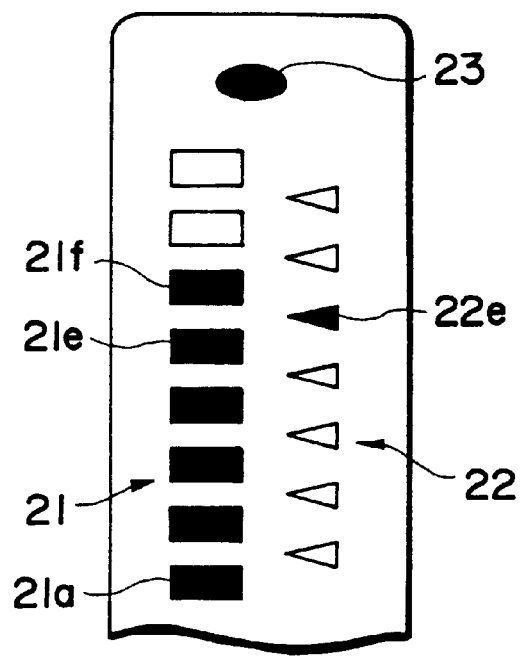

In FIGS. 7*a* and 7*b,* the adjusted threshold level is Vth0+2d and the threshold level indicator lamp 22*e* is lighted. If the received light level does not reach the threshold level, the output indicator lamp 23 is not lighted. Of the indicator lamps of the received light level display device 21, the indicator lamp(s) positioned below the indicator lamp 21*e* (inclusive of the lamp 21*e*) are lighted in accordance with the received light level (FIG. 7*a*). If the received light level exceeds the threshold level, the output indicator lamp 23 is lighted. All the indicator lamps 21*a*–21*e* and indicator lamp(s) above the indicator lamp 21*f* (inclusive of the lamp 21*f*) are lighted in accordance with the received level (FIG. 7*b*).

Figure 7C:
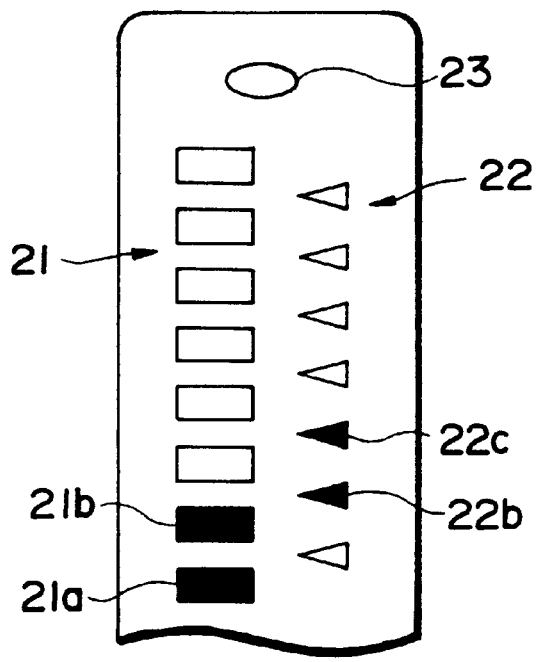
Figure 7D:
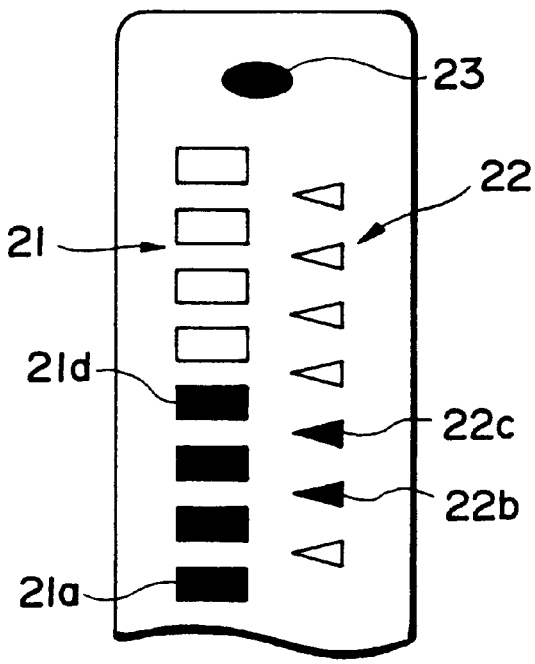

FIGS. 7*c* and 7*d* show a case where the adjusted threshold level is Vth0−3d. The threshold level indicator lamps 22*b* and 22*c* are lighted. When the received light level is less than the threshold level, the output indicator lamp 23 is not lighted (FIG. 7*c*). When the received light level exceeds the threshold level, the output indicator lamp 23 is lighted (FIG. 7*d*). The received light level indicator lamps are turned on in accordance with the received light level. As seen from FIG. 6, the received light level indicator 21*a*–21*c* are lighted in a case where the received light level Vin meets the condition Vth0−4d<Vin≦Vth0−2d. Even the indicator lamps 21*a*–21*c* are lighted, the output indicator lamp 23 is turned on in same cases but is not turned on in the other cases, since the threshold level is Vth0−3d.

As described above, the received light level is indicated by the received light level indicator lamps, and the threshold level is also indicated, so that the user can clearly recognize the relation between the received light level and the threshold level. In a case where the received light level exceeds the threshold level, the output indicator lamp 23 is turned on and a detection signal is outputted outside. Accordingly, the user can adjust the threshold level while he or she recognizes the relation between the received light level and the threshold level in a state in which the object is sensed or in a state in which the object is not sensed. Further the user can know a margin of the received light level with respect to the threshold level.

Although the description is made with regard to the manual tuning in the threshold level adjusting processing, an automated tuning is also adopted. In the automated tuning, for example, the user selects the teach mode by the operation mode selecting switch 41 and depresses the setting button in a state where no work exists in the detection area. Next the user changes over to the adjust mode, and depresses the setting button 44 for a predetermined time period or more. Lastly the user sets the run mode. In response to the above operation by the user, the control unit 10 thereafter performs the automated adjusting processing of the threshold level at a predetermined time interval (for example, thirty minutes, this time interval may be changed). In the automated adjusting processing of the threshold level, the threshold level is so changed that the threshold level is positioned between the maximum value and the minimum value of the received light level.

The above description relating to the output indicator lamp 23 is made with regard to the light-on mode. The same is true for the dark-on mode with respect to the processings of threshold level setting and threshold level adjusting. The output indicator lamp 23 is turned on and the detection signal is outputted when the received light level is below the threshold level.

In the above embodiment, first, the initial threshold level is set in the teach mode, and then the initial threshold level is corrected (finely adjusted) in the adjust mode. Alternatively, another arrangement may be adopted in which a threshold level is set at any level of a plurality of points (thirteen levels in the above example).

The present invention is applied to the reflective-type photoelectric sensor in the above embodiment. The present invention may be applied to various types of the sensing devices. For example, a photoelectric sensor includes a transmission type, and in another aspect, an optical fiber type. The feature quantity may be the received light level (received light quantity) in a case of the photoelectric sensor.

Another feature quantity may be used in a case of another type of sensing device. For example, the present invention may be applied to a proximity switch or sensor. The proximity switch generally includes a detection coil which serves as a part of an oscillating circuit. The oscillation amplitude may be the feature quantity in a proximity switch of a type in which the oscillation amplitude is changed in accordance with distance between the detection coil and the object to be detected (or in accordance with existence or absence of the object). The oscillation frequency (or voltage in a case where the frequency is converted to the voltage) may serve as the feature quantity in a proximity switch of a type in which the oscillation frequency is changed. The above feature quantity is compared with the threshold value.

In a pressure sensor, pressure, or capacitance, resistance of a piezoelectric resistance element, voltage, current or frequency of a detection circuit or the like in accordance with the types of the pressure sensors may be the feature quantity. The same is true for a vibration sensor. The pressure sensor and the vibration sensor include those manufactured by micromachining technology.

The present invention is also applicable to a color sensor. An example of the color sensor is disclosed in the Japanese application No. 9-169061. This color sensor projects three-color light beams of R (red), G (green) and B(blue) toward an object to be sensed in time sharing manner. The light reflected from or transmitted through the object is received by a light receiving element. The received light levels of R, G and B with respect to a reference object having a reference color are measured and stored in advance. Differences are respectively calculated between the received light levels of R, G and B obtained from an object to be sensed and the received light levels of R, G and B obtained from the reference object and stored. The maximum value of the above differences is compared with a permissible value (a limit of an allowable range of an error). If the maximum difference is less than the permissible value, the color of the object to be sensed is judged to be the same as the reference color. In such the color sensor, the maximum difference is the feature quantity and the permissible value is the threshold value.

Some of photoelectric switches and proximity switches have so called hysteresis switching characteristic in which an on-point and an off-point are set and an output changes from an on-state to an off-state along a path and the output changes from the off-state to the on-state along another path. The present invention is applicable to such the switches or sensors. Description is made on a photoelectric sensor as a representative of switches (sensors) having the hysteresis characteristic.

Figure 8:
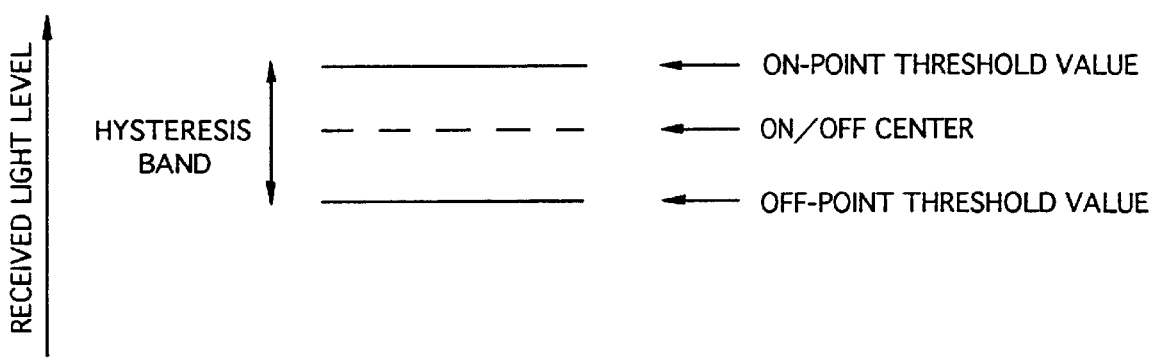
FIG. 8 illustrates an operation of a sensing device which has a hysteresis output characteristic.

The output hysteresis characteristic of a photoelectric sensor will be explained with reference to FIG. 8. The light-on mode is presumed. An on-threshold value and an off-threshold value are set at different received light levels. The on-threshold value is higher than the off-threshold value. In a case where the sensor output is an off state (for example, an object is not sensed), when the received light level exceeds the on-point, the sensor output is changed to an on-state (for example, an object is sensed). In a case where the sensor output is the on-state, when the received light level lowers below the off-point, the sensor output is changed to the off-state. The difference between the on-threshold value and the off-threshold value is called a hysteresis band (width). An on/off center level is assumed at a just middle point between the on-threshold value and the off-threshold value.

Figure 9:
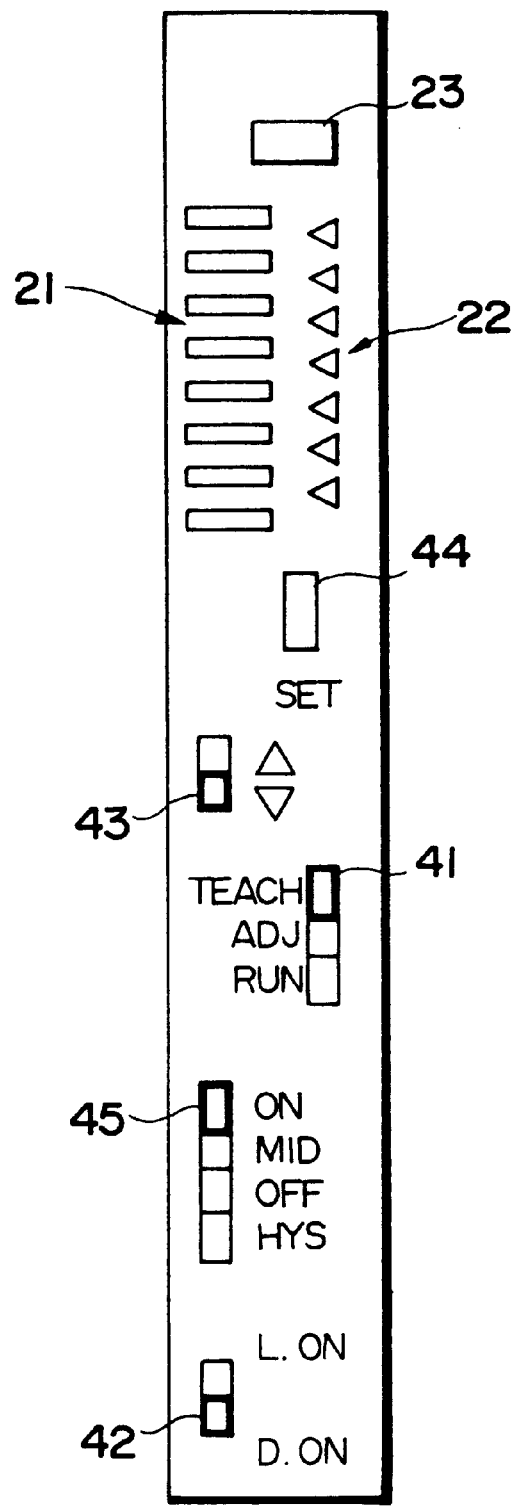
FIG. 9 is a front view of an operation panel of a sensing device according to the second embodiment of the present invention.

FIG. 9 shows an operation panel of the photoelectric switch. The same parts or elements as those shown in FIG. 2 are denoted by the same reference numerals to avoid overlapped description.

The operation panel is provided with a threshold level display mode selecting switch 45. The operation projection of this switch has four positions, i.e., ON, MID, OFF and HYS. When the ON display mode is selected, the on-point threshold value is displayed on the threshold value display device 22. When the OFF display mode is selected, the off-point threshold level is displayed. When the MID display mode is selected, the on/off center level is displayed on the threshold value display device 22. The on/off center level corresponds to the threshold value in the embodiment shown in FIG. 1–7. When HYS display mode is selected, the hysteresis band is displayed by the threshold level display device 22. The on-point threshold value, the off-point threshold value, the on/off center level and the hysteresis band are kinds of threshold values.

Figure 10:
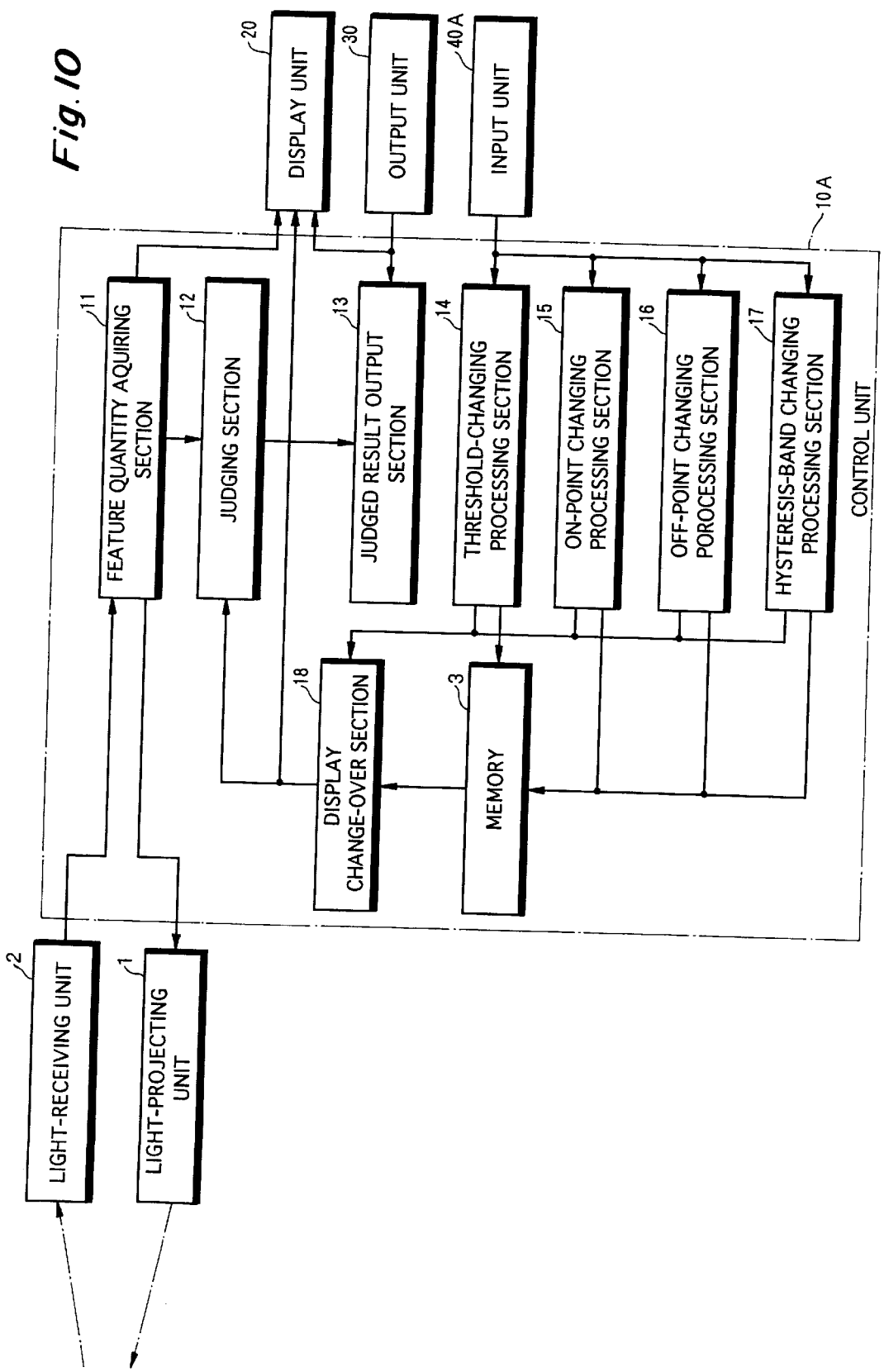
FIG. 10 is a block diagram showing an electrical functional construction of the sensing device according to the second embodiment.

FIG. 10 shows an electrical construction of the photoelectric sensor. The same blocks as shown in FIG. 1 are denoted by the same reference numerals to avoid overlapped explanation.

The control unit 10A is realized by a microcomputer. A on-point changing processing section 15, an off-point changing processing section 16, a hysteresis-band changing processing section 17 and a display change-over section 18 are illustrated as functions performed by the microcomputer.

The memory 3 stores therein the on-point threshold value, the off-point threshold value, the on/off center level, the hysteresis band, the threshold level adjusting resolution d and other data. All of the on-point threshold value, the off-point threshold value, the on/off center level and the hysteresis band are not necessarily stored, since the on/off center level is positioned in the middle between the on-point threshold value and the off-threshold value, and the hysteresis represents the difference between the on-point threshold value and the off-point threshold value. For example, the on-point threshold value and the off-point threshold value are sufficient to be stored. Alternatively, only the on/off center level and the hysteresis band may be stored. Further, only the on-point threshold value and the hysteresis band may be stored.

The input unit 40A includes a threshold level display mode selecting switch 45 in addition to the operation mode selecting switch 41, the output mode selecting switch 42, the adjust direction selecting switch 43 and the setting button 44.

As will be described in detail later, the threshold changing procesing section 14 performs adjustment of the on/off center level and stores the adjusted on/off center level in the memory 3. The on-point changing processing section 15, the off-point changing processing section 16 and the hysteresis-band changeing processing section 17 respectively perform adjustment processing of the on-point threshold value, the off-point threshold value and the hysteresis band and store the adjusted on-point threshold value, the off-point threshold value and the hysteresis band in the memory 3. These various threshold value adjustment processings are executed in response to an adjust direction instruction from the adjust direction selecting switch 43 and an input from the setting button 44, when the adjust mode is selected by the operation mode selecting switch 41, and the MID, ON, OFF and HYS mode are respectively selected by the threshold level display mode selecting switch 45.

The display change-over section 18 controls the display unit 20 such that a threshold of a kind which is selected by the threshold level display mode selecting switch 45 is displayed by the threshold level display indicator lamp.

FIG. 11 shows a procedure of the threshold level display changing processing performed by the control unit 10A. This processing is performed when the threshold level display mode is changed using the threshold level display mode selecting switch 45.

The threshold level display changing processing can be executed only when the adjust (ADJ) mode or run (RUN) mode is selected by the operation mode selecting switch 41 (steps 121 and 122). In a case of the teach (TEACH) mode, the threshold level indicator lamp displays the on/off center level.

When the adjust mode or run mode is set, the threshold level indicator lamps display the threshold level of the kind which corresponds to the mode selected by the threshold level display mode selecting switch 45. That is, if the ON display mode is selected, the on-point threshold value is displayed (YES at steps 123 and 126), if the MID display mode is selected, the on/off center level is displayed (YES at steps 124 and 127), if the OFF display mode is selected, the off-point threshold value is displayed (YES at step 125 and 128), and if the HYS display mode is selected, the hysteresis band is displayed (NO at step 125 and 129).

FIGS. 12a to 12c shows examples of display of various threshold levels by the threshold level indicator lamps. FIG. 12a illustrates the off-point threshold value, FIG. 12b, the on/off center level, and FIG. 12c, the on-point threshold level.

FIGS. 13a and 13b show display examples of the hysteresis band. FIG. 13a illustrates the case in which hysteresis band is d, and FIG. 13b illustrates the case in which the hysteresis band is 3d or 4d. In FIG. 13b, the indicator lamp 22d indicates the on/off central level. The indicator lamp 22e, or the indicator lamps 22e and 22d indicates the on-point threshold value. The indicator lamps 22d and 22c, or the indicator lamp 22c indicates the off-point threshold value. The indicator lamps turned on over the range of the hysteresis band.

The initial setting of the threshold value is executed in the teach mode. The operation by the user and the threshold level setting processing in the teach mode are the same as those in the above mentioned embodiment (FIG. 3, step 102). The hysteresis band is determined in advance. The threshold level set in the teach mode serves as the on/off center level, and the on-point threshold value and the off-point threshold value are automatically set above and below the on/off level, respectively. The threshold level indicator lamps display the on/off center level.

The on/off center level, the on-point threshold value, the off-point threshold value and the hysteresis band, which have been set as described above, are adjusted in the adjust mode.

When the operation mode selecting switch 41 is set to the adjust mode, and the threshold level display mode selecting switch 45 selects the MID display mode, the on/off center level can be adjusted. The adjustment of the on/off center level is the same as the threshold level adjusting processing (FIG. 3, step 104) in the above embodiment. The threshold level indicator lamps display the on/off center level being adjusted or having been adjusted (See FIG. 4).

In the adjust mode, when the ON display mode is selected by the threshold level display mode selecting switch 45, the adjustment of the on-point threshold level is possible. The user selects one of the direction in which the on-point threshold value becomes higher or the direction in which the on-point threshold value becomes lower by the adjust direction selecting switch 43, and depresses the setting button 44. Whenever the setting button 44 is depressed, the on-point threshold value changes by the resolution d in the direction designated by the adjust direction selecting switch 43. The on-point threshold value is displayed by the threshold value indicator lamp.

The adjustment of the off-point threshold level is performed in the same way as the on-point threshold level adjustment, when the OFF display mode is selected by the display mode selecting switch 45.

The adjustment of the hysteresis band can be executed when the HYS display mode is selected by the threshold level display mode selecting switch 45 in the adjust mode. The adjust direction selecting switch 43 is set in the ascending direction when the hysteresis band is widened, but the adjust direction selecting switch 43 is set in the descending direction when the hysteresis is narrowed. The hysteresis band in widened or narrowed by d (by 0.5d above and below the on/off center) each time the setting button 44 is depressed.

In the above embodiments, the received light level display device 21 (the feature quantity display device) and the threshold level display device 22 (the threshold value display device) respectively comprise LEDs. These display devices 21 and 22 may be realized by a liquid crystal display (LCD) device. The received light level display device 21 may be constituted by an LCD device and the threshold level display device 22 may be constituted by an LCD device. Alternatively, both the received light level display device 21 and the threshold level display device 22 may be constituted by an LCD device. The shapes of the indicator lamps 21a–21h and the shapes of the indicator lamps 22a–22g (the shapes may not necessarily be the same as those shown in FIGS. 2 and 9) may be expressed on a liquid crystal display panel (a display surface) of the LCD device(s) by dots or areas (segments). Alternatively, liquid crystal display segments having the shapes of the indicator lamps may be arranged on the operation panel.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensing device comprising:

means for acquiring a feature quantity representing a physical state to be sensed, a feature quantity display device, which includes a plurality of first indicator elements arranged in a line, for indicating the feature quantity acquired by said feature quantity acquiring means by a bar graph expressed by said first indicator elements;

a threshold display device, which includes a plurality of second indicator elements arranged in correspondence with the first indicator elements of said feature quantity display device, for displaying a set threshold value in correlation with the bar graph;

judging means for comparing the feature quantity acquired by said feature quantity acquiring means with the threshold value and for outputting a comparison result;

means for changing the threshold value in a plurality of discrete points in correlation with the second indicator elements in said threshold display device as the acquired feature quantity is being compared with the threshold value by said judging means; and means for holding the threshold value changed by said threshold changing means, wherein said threshold display device indicates the threshold value held by said threshold holding means, and said judging means uses the threshold value held by said threshold holding means in making the comparison with the feature quantity.

2. The sensing device according to claim 1, wherein said threshold display device includes n first indicator elements and indicates the threshold value in 2n−1 points by the selected one or plural indicator elements.

3. A sensing device comprising:

means for acquiring feature quantity representing a physical state to be sensed;

a feature quantity display device which includes a plurality of first indicator elements arranged in a line, for indicating the feature quantity acquired by said feature quantity acquiring means by a bar graph expressed by said first indicator elements;

threshold processing means, which include an input device, for setting a threshold value or changing the set threshold value in response to an input in said input device;

threshold holding means for holding the threshold value set or changed by said threshold processing means;

a threshold display device, which includes a plurality of second indicator elements arranged in correspondence with the first indicator elements of said feature quantity display device, for displaying the threshold value held in said threshold holding means in correlation with the bar graph; and judging means for comparing the feature quantity acquired by said feature quantity acquiring means with the threshold value held in said threshold holding means, and for outputting the comparison result.

4. A display method in a sensing device which acquires a feature quantity representing a physical state to be sensed and compares the acquired feature quantity with a threshold value to output a comparison result, comprising the steps of:

displaying the acquired feature quantity by a bar graph expressed by a plurality of first indicator elements which are arranged so as to form a row;

displaying the threshold value separately from said acquired feature quantity by a plurality of second indicator elements which are disposed in correspondence with said first indicator elements in correlation with the bar graph display; and adjusting the threshold value in response to an input entered by a user to display the adjusted threshold value.

5. A sensing device for acquiring a feature quantity representing a physical state to be sensed and for comparing the acquired feature quantity with a threshold value to output a signal representing the comparison result, comprising:

feature quantity display device means for displaying the feature quantity by a length representing the feature quantity in a predetermined zone for display;

threshold display means for displaying the threshold value at a position of a plurality of positions in correlation with the predetermined zone for display of said feature quantity display means; and adjusting means including an input device operable by a user for adjusting stepwise the threshold value in correlation with the plurality of positions in response to an input from said input device, wherein said threshold display means displays the threshold value adjusted by said adjusting means.

6. The sensing device according to claim 5, wherein said adjusting means changes a threshold which has been set in a plurality of discrete points in an ascending direction and in a plurality of discrete points in a descending direction in response to the input from said input device.

7. The sensing device according to claim 5, wherein said adjusting means includes an adjusting direction selecting device and a value-change instructing device, and causes the threshold position currently displayed to move in a direction selected by said adjusting direction selecting device by a number of steps instructed by said value-change instructing device.

8. The sensing device according to claim 5 which has different threshold values relating to an on-point and an off-point, further comprising a device for selecting one of the on-point or the off-point wherein said adjusting means adjusts the threshold value relating to the point selected by said selecting device, and said threshold display means displays the threshold value relating to the point selected by said selecting means.

9. The sensing device according to claim 5 which has a hysteresis band, wherein said adjusting means adjusts the hysteresis band, and said threshold display means displays the hysteresis band.

10. A sensing device for acquiring feature quantity representing a physical state to be sensed and for comparing the acquired feature quantity with a threshold value to output a signal representing the comparison result, comprising:

feature quantity display device means for displaying the feature quantity by a length representing the feature quantity in a predetermined zone for display;

threshold display means for displaying the threshold value at a position of a plurality of positions in correlation with and separate from the predetermined zone for display of said feature quantity display means; and setting means for setting stepwise the threshold value in correspondence with the plurality of positions in said threshold display means as the acquired feature quantity is being compared with the threshold value, wherein said threshold display means displays the threshold value set by said setting means.

11. The sensing device according to claim 10, wherein said setting means includes means for selecting one of an on-point or off-point and sets the threshold value relating to the selected point, and said threshold display means displays the threshold value relating to the selected point.

12. A sensing device comprising:

a control unit including a first circuit for acquiring a feature quantity representing a physical state to be sensed;

a feature quantity display device, which includes a plurality of first indicator elements arranged in a line, for indicating the feature quantity acquired by the first circuit of said control unit by a bar graph expressed by the first indicator elements; and a threshold display device, which includes a plurality of second indicator elements arranged in correspondence with the first indicator elements of said feature quantity display device, for displaying a set threshold value in correlation with the bar graph, wherein said control unit further includes a second circuit for comparing the feature quantity acquired by the first circuit with the threshold value and for outputting a comparison result, a third circuit for changing the threshold value in a plurality of discrete points in correlation with the second indicator elements in said threshold display device as the feature quantity acquired by the first circuit is being compared with the threshold value by the second circuit, and a fourth circuit for holding the threshold value changed by the third circuit, and wherein said threshold display device indicates the threshold value held by said fourth circuit, and said second circuit uses the threshold value held by said fourth circuit in making comparison with the feature quantity.

13. A sensing device comprising:

a first processor for acquiring a feature quantity representing a physical state to be sensed;

a feature quantity display device which includes a plurality of first indicator elements arranged in a line, for indicating the feature quantity acquired by said first processor by a bar graph expressed by the first indicator elements;

a second processor, which includes an input device, for setting a threshold value or changing the set threshold value in response to an input in said input device;

a memory for holding the threshold value set or changed by said second processor;

a threshold display device, which includes a plurality of second indicator elements arranged in correspondence with the first indicator elements of said feature quantity display device, for displaying the threshold value held in said memory in correlation with the bar graph; and a third processor for comparing the feature quantity acquired by the first processor with the threshold value held in said memory, and for outputting a comparison result.

14. A sensing device for acquiring a feature quantity representing a physical state to be sensed and for comparing the acquired feature quantity with a threshold value to output a signal representing the comparison result, comprising:

a feature quantity display device for displaying the feature quantity by a length representing the feature quantity in a predetermined zone for display;

a threshold display device for displaying the threshold value at a position of a plurality of positions in correlation with the predetermined zone for display of said feature quantity display device; and a control unit, including an input device operable by a user, for adjusting stepwise the threshold value in correlation with the plurality of positions in response to an input from said input device, wherein said threshold display device displays the threshold value adjusted by said control unit.

15. A sensing device for acquiring a feature quantity representing a physical state to be sensed and for comparing the acquired feature quantity with a threshold value to output a signal representing the comparison result, comprising:

a feature quantity display device for displaying the feature quantity by a length representing the feature quantity in a predetermined zone for display;

a threshold display device for displaying the threshold value at a position of a plurality of positions in correlation with and separate from the predetermined zone for display of said feature quantity display device; and a control unit for setting stepwise the threshold value in correspondence with the plurality of positions in said threshold display device as the acquired feature quantity is being compared with the threshold value, wherein said threshold display device displays the threshold value set by said control unit.

* * * * *